United States Patent
Dozier et al.

(10) Patent No.: US 10,277,030 B2
(45) Date of Patent: Apr. 30, 2019

(54) LOAD BALANCING FOR POWER DISTRIBUTION

(71) Applicant: SCHNEIDER ELECTRIC IT CORPORATION, West Kingston, RI (US)

(72) Inventors: Ross Everett Dozier, Wildwood, MO (US); Michael Kenneth Schmidt, St. Charles, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 40 days.

(21) Appl. No.: 15/320,628

(22) PCT Filed: Jun. 30, 2014

(86) PCT No.: PCT/US2014/044862
§ 371 (c)(1),
(2) Date: Dec. 20, 2016

(87) PCT Pub. No.: WO2016/003410
PCT Pub. Date: Jan. 7, 2016

(65) Prior Publication Data
US 2017/0149243 A1    May 25, 2017

(51) Int. Cl.
*G06F 1/28*     (2006.01)
*H02J 3/14*     (2006.01)
(Continued)

(52) U.S. Cl.
CPC .................. *H02J 3/14* (2013.01); *G06F 1/26* (2013.01); *G06F 1/28* (2013.01); *H02J 3/18* (2013.01);
(Continued)

(58) Field of Classification Search
USPC .......................................................... 307/31
See application file for complete search history.

(56) References Cited

U.S. PATENT DOCUMENTS

| 8,212,395 B2 | 7/2012 | Jansma |
| 8,674,556 B2 | 3/2014 | Tinaphong et al. |

(Continued)

FOREIGN PATENT DOCUMENTS

| CA | 2763421 A1 | 7/2012 |
| CN | 102687362 A | 9/2012 |

(Continued)

OTHER PUBLICATIONS

"Improve Your Power Factor, Reduce Your Reactive-Power Costs," The New Reactive-Power Charge and Mandatory Hourly Pricing, conEdison, Oct. 2010, 2 pages.

(Continued)

*Primary Examiner* — Rexford N Barnie
*Assistant Examiner* — Xuan Ly
(74) *Attorney, Agent, or Firm* — Lando & Anastasi, LLP

(57) ABSTRACT

According to one aspect, embodiments of the invention provide a PDU comprising an input configured to receive 3-phase power from a power source, a plurality of phase lines, each phase line configured to carry one phase of the 3-phase power, at least one outlet, at least one switch circuit configured to selectively couple the at least one outlet to the plurality of phase lines, a data connection, and a controller, wherein the controller is configured to monitor current from the plurality of phase lines to the at least one outlet, receive, via the data connection, phase loading information related to 3-phase power of at least one external device coupled to the power source, and operate the at least one switch circuit to (Continued)

selectively couple the at least one outlet to at least one of the plurality of phase lines based on the current and the received phase loading information.

15 Claims, 5 Drawing Sheets

(51) Int. Cl.
*H02J 3/18* (2006.01)
*H02J 3/26* (2006.01)
*G06F 1/26* (2006.01)

(52) U.S. Cl.
CPC .............. *H02J 3/26* (2013.01); *Y02B 70/3225* (2013.01); *Y02E 40/50* (2013.01); *Y04S 20/222* (2013.01)

(56) References Cited

U.S. PATENT DOCUMENTS

| | | | | |
|---|---|---|---|---|
| 8,810,081 | B1* | 8/2014 | Flegel | H01R 13/447 307/30 |
| 2004/0001292 | A1* | 1/2004 | Vanderkolk | H02H 3/33 361/42 |
| 2008/0309164 | A1 | 12/2008 | Lim | |
| 2011/0101777 | A1* | 5/2011 | Jansma | H02J 1/14 307/38 |
| 2011/0245988 | A1 | 10/2011 | Ingels et al. | |
| 2012/0117392 | A1* | 5/2012 | Turicchi, Jr. | G06F 1/263 713/300 |
| 2013/0218497 | A1 | 8/2013 | Stanlake | |
| 2014/0001850 | A1* | 1/2014 | Guillemin | H02J 3/26 307/31 |

FOREIGN PATENT DOCUMENTS

| | | |
|---|---|---|
| CN | 103354361 A | 10/2013 |
| EP | 0886904 A1 | 12/1998 |
| EP | 2505967 A1 | 10/2012 |
| EP | 2533390 A2 | 12/2012 |
| WO | 1996037940 A1 | 11/1996 |
| WO | 2013101865 A1 | 7/2013 |

OTHER PUBLICATIONS

"Poly Phase Multifunction Energy Metering IC with Per Phase Information," Data Sheet, ADE7758, Analog Devices, Inc., 2004-2011, 73 pages.

"Quick-Start Guide—North American Applications," MPXTM PEMTM, Emerson Network Power, Liebert, SL-20821_REV5_01-14, 2 pages.

"Reactive Power Charge," PSO—Reactive Power Charge, American Electric Power Co., Inc., 1996-2014, 2 pages.

Notification of Transmittal of the International Search Report and the Written Opinion of the International Searching Authority from corresponding PCT/US2014/044862 dated Oct. 28, 2014.

Extended European Search Report from corresponding European Application No. 14896708.6 dated Jan. 30, 2018.

* cited by examiner

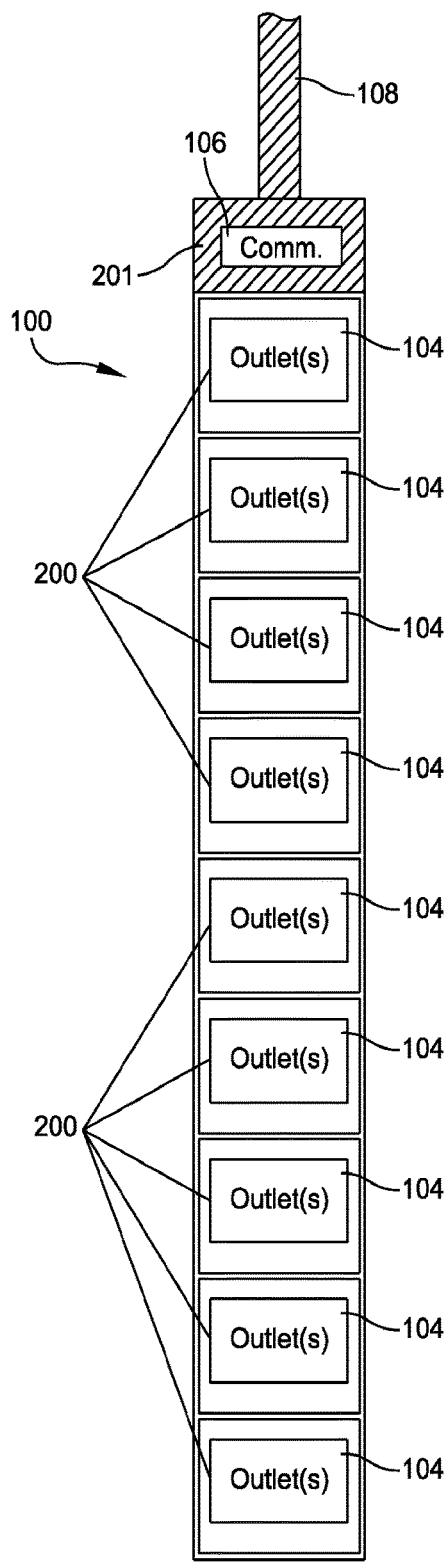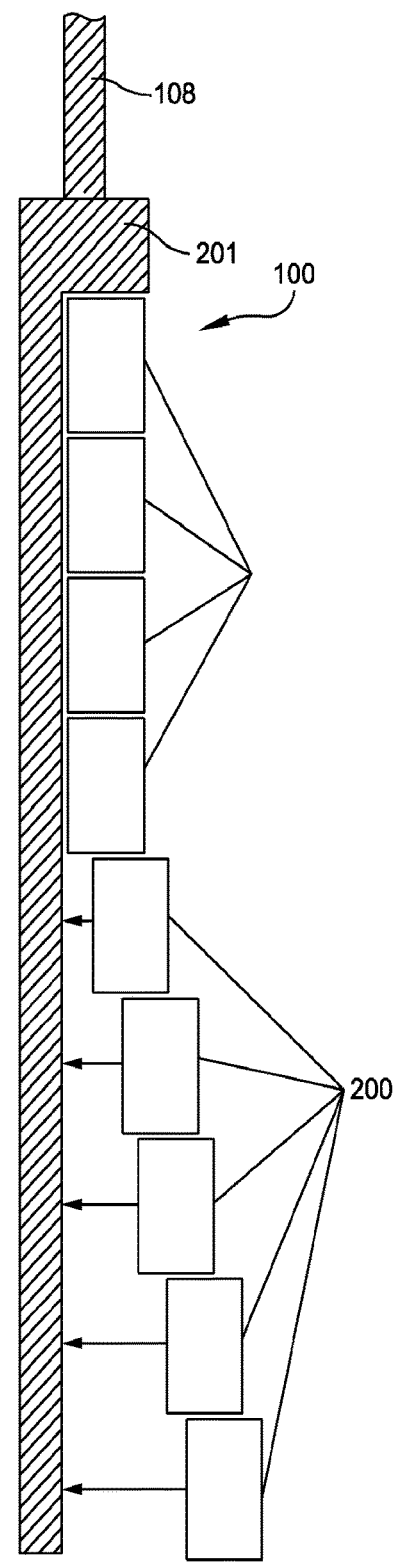
FIG. 1B
FIG. 1C

LOAD BALANCING FOR POWER DISTRIBUTION

CROSS-REFERENCE TO RELATED APPLICATIONS

This application is a U.S. National Stage Application under 35 U.S.C. § 371 of International Application No. PCT/US2014/044862, filed Jun. 30, 2014, titled LOAD BALANCING FOR POWER DISTRIBUTION, which is hereby incorporated herein by reference in its entirety.

BACKGROUND OF INVENTION

1. Field of Invention

The present invention relates generally to systems and methods for controlling a Power Distribution Unit (PDU).

2. Discussion of Related Art

Centralized data centers for computer, communications and other electronic equipment have been in use for a number of years. Typical centralized data centers contain numerous racks of equipment that require power, cooling and connections to communication facilities. A Power Distribution Unit (PDU) is a device typically used to distribute power from a power source input to several other devices. In a data center environment, a PDU may be used to supply power to servers, network equipment, or other devices within an enclosure or rack. A large PDU may be used to supply power to large power consuming devices such as cooling equipment or an entire enclosure or rack.

SUMMARY OF INVENTION

At least one aspect of the invention is directed to a Power Distribution Unit (PDU), the PDU comprising an input configured to be coupled to a power source to receive 3-phase power from the power source, a plurality of phase lines coupled to the input, each phase line configured to carry one phase of the 3-phase power, at least one outlet, at least one switch circuit configured to selectively couple the at least one outlet to the plurality of phase lines, a data connection, and a controller coupled to the at least one switch circuit and the data connection, wherein the controller is configured to monitor current from the plurality of phase lines to the at least one outlet, receive, via the data connection, phase loading information related to 3-phase power of at least one external device coupled to the power source, and operate the at least one switch circuit to selectively couple the at least one outlet to at least one of the plurality of phase lines based on the current and the received phase loading information.

According to one embodiment, the PDU further comprises at least one current monitor coupled to the at least one outlet and the controller, the at least one current monitor configured to generate at least one signal indicative of current of the at least one of the plurality of phase lines to the at least one outlet and to provide the at least one signal to the controller. In one embodiment, the PDU further comprises a neutral line coupled to the input and the at least one switch circuit comprises a first switch circuit configured to selectively couple the at least one outlet to a first one of the plurality of phase lines, and a second switch circuit configured to selectively couple the at least one outlet to one of the neutral line and a second one of the plurality of phase lines. In another embodiment, in operating the at least one switch circuit, the controller is further configured to operate the first switch circuit and the second switch circuit to provide one of a phase-to-phase voltage and a phase-to-neutral voltage to the at least one outlet based on the at least one signal indicative of current and the received phase loading information.

According to another embodiment, the controller is further configured to transmit, to the at least one external device via the data connection, phase loading information based on the current. In one embodiment, the controller is further configured to receive phase loading information from an external device that is substantially the same as the PDU.

Another aspect of the invention is directed to a method for operating a PDU, the PDU comprising a power input configured to receive 3-phase power from a power source and at least one outlet configured to provide at least one phase of the 3-phase power to a load coupled to the at least one outlet, the method comprising monitoring current from the power input to the at least one outlet, receiving, from at least one external device coupled to the power source, phase loading information related to the 3-phase power, and selectively coupling the at least one outlet to at least one phase of the 3-phase power based on the current and the received phase loading information.

According to one embodiment, selectively coupling the at least one outlet comprises selectively coupling the at least one outlet to a first phase of the 3-phase power and a second phase of the 3-phase power to provide a phase-to-phase voltage to the at least one outlet. In one embodiment, selectively coupling the at least one outlet comprises selectively coupling the at least one outlet to a first phase of the 3-phase power and a neutral line of the PDU to provide a phase-to-neutral voltage to the at least one outlet.

According to another embodiment, receiving phase loading information comprises receiving, from the at least one external device, a total load amount of the at least one external device and an identification of at least one phase, of the 3-phase power, which is providing at least a portion of the total load amount to the at least one external device. In one embodiment, selectively coupling the at least one outlet comprises calculating a total load amount per phase of the 3-phase power based on the current and the received total load amounts and phase identifications. In another embodiment, selectively coupling the at least one outlet further comprises identifying a highest loaded phase and a least loaded phase of the 3-phase power based on the calculated total load amounts per phase of the 3-phase power, and calculating a load transfer amount based on the calculated total load amount of the highest loaded phase.

According to one embodiment, selectively coupling the at least one outlet further comprises generating an ordered list of transferable loads based on the monitored current and the received total load amounts and phase identifications. In one embodiment, generating the ordered list of transferable loads include generating the ordered list of transferable loads based on a network address of the at least one external device. In another embodiment, selectively coupling the at least one outlet further comprises selecting a first one of the transferable loads from the ordered list, determining whether the first one of the transferable loads is less than the load transfer amount, and in response to a determination that the first one of the transferable loads is less than the load transfer amount, subtracting the first one of the transferable loads from the load transfer amount to generate an updated load transfer amount and determining whether the first one of the transferable loads is associated with the at least one outlet.

According to another embodiment, selectively coupling the at least one outlet further comprises in response to a determination that the first one of the transferable loads is associated with the at least one outlet, coupling the at least one outlet to the least loaded phase of the 3-phase power, and in response to a determination that the first one of the transferable loads is not associated with the at least one outlet, selecting a second one of the transferable loads from the ordered list and determining whether the second one of the transferable loads is less than the updated load transfer amount. In one embodiment, selectively coupling the at least one outlet further comprises in response to a determination that the second one of the transferable loads is less than the updated load transfer amount, subtracting the second one of the transferable loads from the updated load transfer amount, and determining whether the second one of the transferable loads is associated with the at least one outlet.

According to one embodiment, selectively coupling the at least one outlet further comprises in response to a determination that the second one of the transferable loads is associated with the at least one outlet, coupling the at least one outlet to the least loaded phase of the 3-phase power. In one embodiment, the method further comprises determining if redundant power is available, and selectively coupling includes selectively coupling the at least one outlet to at least one phase of the 3-phase power in response to a determination that redundant power is available.

At least one aspect of the invention is directed to a data center, the data center comprising a power source providing 3-phase power, a plurality of PDUs, each coupled to the power source and configured to receive the 3-phase power and provide at least one phase of the 3-phase power to at least one load, a network coupled to the plurality of PDUs, and means for sharing phase loading information related to the 3-phase power between the plurality of PDUs and balancing, across the data center environment, loading of the 3-phase power based on the phase loading information.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1B is a top view of a PDU according to aspects of the current invention;

FIG. 1C is a side view of a PDU according to aspects of the current invention;

DETAILED DESCRIPTION

Figure 1A:
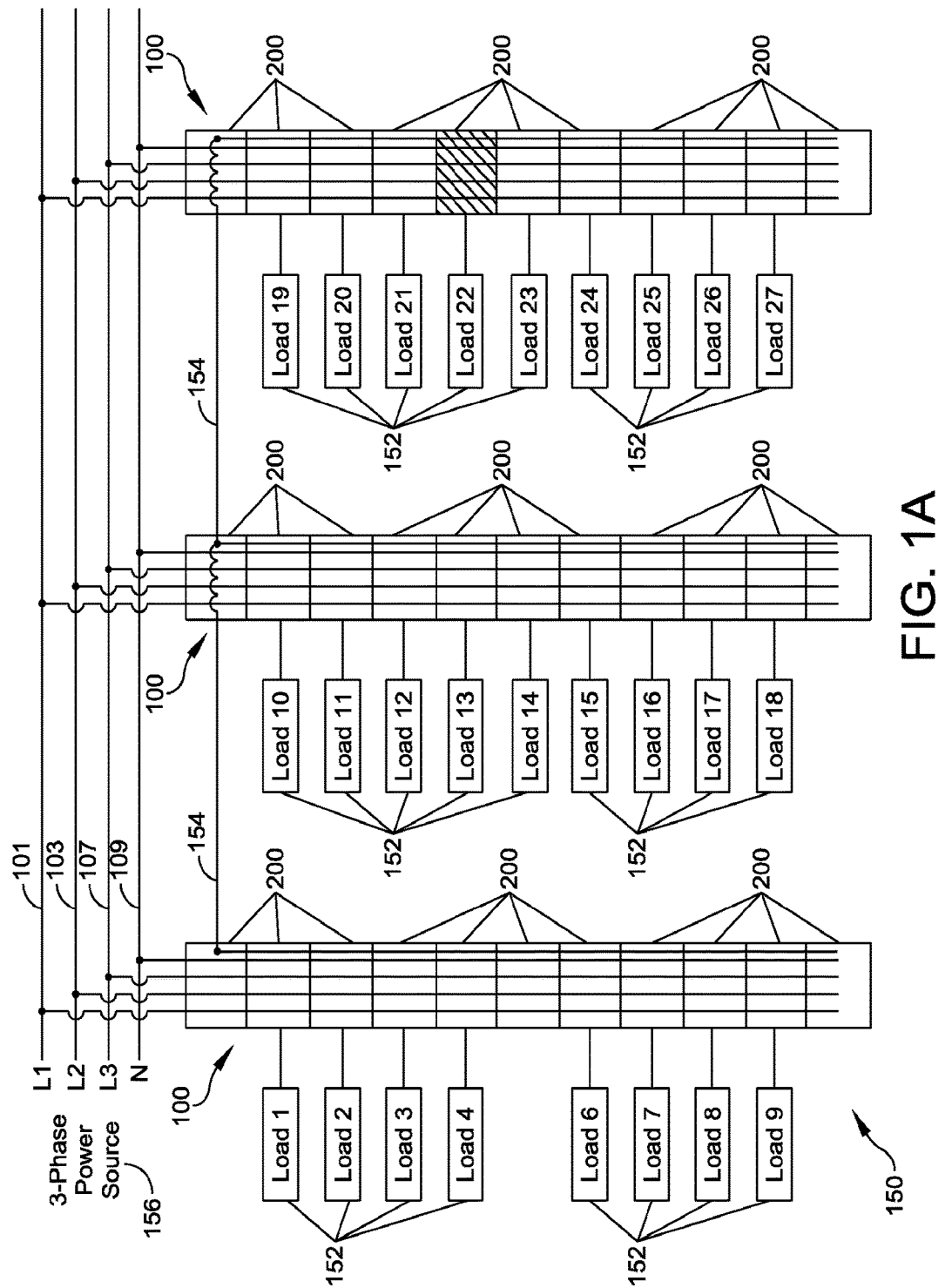
FIG. 1A is a block diagram of a data center environment according to aspects of the current invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, centralized data centers typically contain numerous enclosures or racks of equipment that may include equipment such as servers, network equipment, or other devices. Large date centers commonly rely on three-phase power to satisfy the energy requirements of the equipment (i.e., loads) spread across the numerous enclosures or racks. If the loads applied to each phase are not equal, an unbalance will occur and the system may begin consuming reactive power (VAR). Many power utility companies have begun to charge customers for this reactive power. Increased reactive power may also lead to a higher total supply current than if the system were balanced. Increased total supply current may cause increased heat generation in the wire paths. Heat generation is typically damaging to electronics and may also cause additional power to be consumed by the system's cooling equipment.

Unbalanced loads in a data center may also result in an overloaded phase that trips a corresponding circuit breaker in the system, dropping power to the devices coupled to the overloaded phase. Additionally, unbalanced loads in a data center may result in a stressed power supply, poor voltage to the loads, stressed front-end filtering, increased losses, and/or a reduction in the reliability of a system.

One common obstacle to balancing loads in a data center is that specialized hardware is typically used to connect loads to a predetermined phase. In order to switch loads to a new phase, physical plugs must be moved and often new hardware implemented. Even in the case where plugs are available for all three phases, care has to be taken to plug cords into the correct location. Another obstacle to balancing loads in a data center is that balancing loads across a three phase power system is currently a very labor intensive, manual process. Monitoring the total load on each phase and, in response, manually adjusting the connections of devices to the different phases can be very difficult, especially in view of the addition/removal of equipment, the changing power states of certain equipment, the quantity of devices in the data center, and the variable nature of power draw by certain devices.

Accordingly, a system and method is provided that balances loads across available phases in a data center environment. In at least one embodiment, a power module is configurable to select either a phase-to-phase or phase-to-neutral input for devices coupled to the module. The ability of the power module to select between the lower phase-to-neutral voltage and the higher phase-to-phase voltage give the data center operator enhanced flexibility. In addition, multiple power modules may be connected together via a network, allowing the power modules to communicate to best determine which module(s) should be connected to each phase or phases, based on the power usage of all devices connected to that particular 3-phase power source.

FIG. 1A is a block diagram of a data center environment 150 according to aspects of the current invention. The data center environment 150 includes a 3-phase power source 156, a plurality of PDUs 100, and a network 154. The 3-phase power source 156 includes a first phase line 101, a second phase line 103, a third phase line 107, and a neutral line 109. Each phase line 101, 103, 107 of the 3-phase power source 156 is configured to carry one phase of 3-phase power provided by the power source 156.

Each PDU 100 includes a plurality of power modules 200. Each power module 200 is coupled to the first phase line 101, the second phase line 103, the third phase line 107, and the neutral line 109, and is configured to provide at least one phase of the 3-phase power from the power source 156 to at least one load 152 coupled to the power module 200 (e.g., via an outlet of the power module 200). Each power module 200 is also coupled to the network 154 and is configured to communicate with other power modules 200 (on the same and/or a different PDU 100) via the network 154. In at least one embodiment, the network 154 is a Local Area Network (LAN). However, in other embodiments, the network may be a Wide Area Network (WAN) (e.g., the Internet), a Controller Area Network (CAN), or any other appropriate type of network. As shown in FIG. 1A, each PDU 100 is coupled to the network via a wired connection; however, in other embodiments, at least one of the PDUs 100 may be coupled to the network 154 via a wireless connection (e.g., such as a Wi-Fi, Bluetooth, or ZigBee connection).

FIG. 1B is a top view of a PDU 100 and FIG. 1C is a side view of a PDU 100 according to aspects of the current invention. The PDU 100 includes a backplane 201, a power connection 108, and a plurality of power modules 200. The power connection 108 is configured to be coupled to a power source. For example, in one embodiment, the power connection 108 includes a power cord that is configured to be plugged into a power source (e.g., the 3-phase power source 156 shown in FIG. 1A). Upon being coupled to the power source 156, the power connection 108 is also coupled to the first phase line 101, the second phase line 103, the third phase line 107, and the neutral line 109 of the power source 156 and is configured to receive the 3-phase power from the power source 156. The backplane 201 is coupled to the power connection 108 and is configured to receive the 3-phase power from the power source 156 via the power connection 108. The PDU 100 also includes at least one communication outlet 106 which is coupled to each one of the plurality of power modules 200 via the backplane 201 and is further configured to be coupled to the network 154.

Each one of the plurality of power modules 200 includes at least one electrical outlet 104. In one embodiment, the electrical outlets 104 are C13 outlets; however, in other embodiments, the outlets 104 can be any other type of outlet (e.g., C19 outlets) or electrical connector (e.g., a screw terminal, bus bar, etc.). Each outlet 104 is configured to be coupled to a load 152 (e.g., directly or via a power cord). Each one of the plurality of power modules 200 is also configured to be coupled to the backplane 201. In one embodiment, at least one power module 200 in the PDU 100 is configured to be removable from the PDU 100 (e.g., as shown in FIG. 1C). In such an embodiment, the removable power module 200 may be coupled to the backplane 201 via connector pins, a plug, electrical contacts, or by some other appropriate electrical connector. However, in another embodiment, at least one of the power modules 200 is hardwired into the PDU 100 (i.e., hardwired to the backplane 201) and is not removable from the PDU 100.

Power received by the PDU 100 from the power source 156 is provided to each power module 200 via the power connection 108 and the backplane 201. Each power module 200 is configured to provide at least one phase of the 3-phase power from the power source 156 to a load 152 that is coupled to the power module's corresponding outlet 104.

The PDU 100 may include any number of power modules 200 and each power module 200 may include any number of outlets 104 (i.e., each power module 200 may be coupled to any number of loads 152). In one embodiment, the PDU 100 further includes other operator-related devices, such as a user interface. Also, in one embodiment, the PDU 100 is a rack PDU (rPDU); however, in other embodiments, the PDU 100 may be another type of PDU. The PDU 100 can embody any number of configurations and still fall within the scope of the present disclosure. In addition, any number of PDUs may be included in the data center 150.

Figure 2:
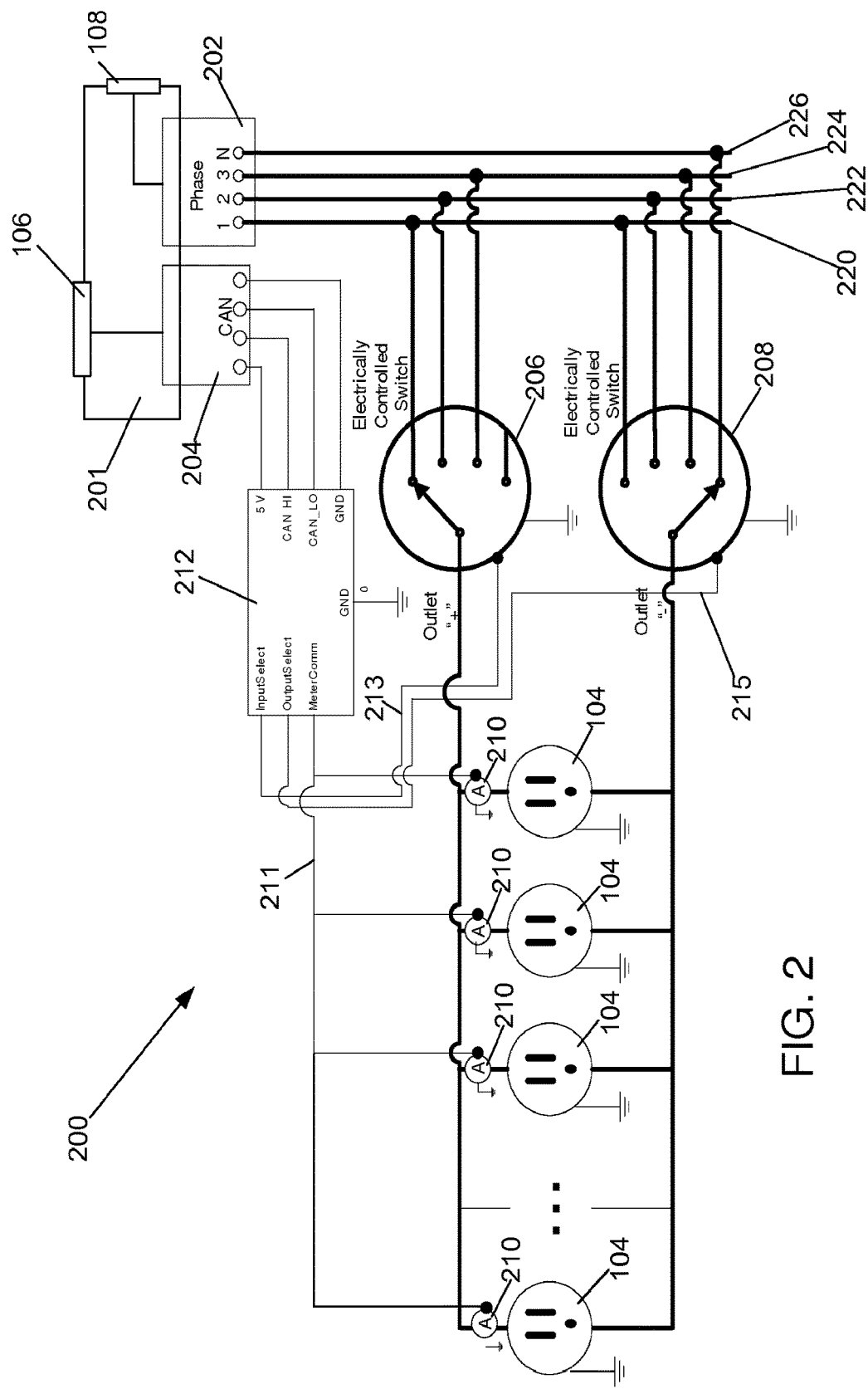
FIG. 2 is a circuit diagram of a power module according to aspects of the current invention.

FIG. 2 is a circuit diagram of a power module 200 according to aspects of the current invention. The power module 200 is included within, or coupled to, the PDU 100 and includes a backplane connector 202, a data connector 204, an input line switching device 206, a return line switching device 208, a plurality of current meters 210, a plurality of electrical outlets 104, and a controller 212.

The data connector 204 is coupled to at least one of the communication outlets 106 via the backplane 201. The communication outlet 106 is configured to be coupled to the network 154 (e.g., to a router or server in the network 154). The controller 212 is coupled to the data connector 204 and is configured to communicate, via the data connector 204 and the communication outlet 106, with external devices (e.g., other power modules in the same PDU 100, or other power modules in other PDUs 100 in the data center 150, that are substantially the same as power module 200) that are coupled to the same power source 156 and the same network 154. In one embodiment, the controller 212 is configured to communicate with the other similar power modules 200 via a Controller Area Network (CAN); however, in other embodiments, the controller 212 may be configured to communicate with the other power modules 200 over a different type of network.

The controller 212 is also coupled to each one of the plurality of current meters 210. Each current meter 210 is coupled to one of the plurality of electrical outlets 104 and is configured to monitor current from the power connection 108 to its corresponding outlet 104 (i.e., to a load 152 coupled to the corresponding outlet 104). According to one embodiment, the controller 212 is coupled to each one of the current meters 210 via a single bus 211. For example, in one embodiment, the single bus 211 is an Inter-Integrated Circuit ($I^2C$) bus; however, in other embodiments, the bus 211 may be another type of bus. In other embodiments, the controller 212 may be coupled to each current meter 210 individually.

The backplane connector 202 is coupled to the power connection 108 via the backplane 201 and is configured to receive 3-phase input power from a power source (e.g., the power source 156 shown in FIG. 1A) coupled to the power connection 108. A first phase of the 3-phase input power is provided to a first phase line 220 coupled to the backplane connector 202, a second phase of the 3-phase input power is provided to a second phase line 222 coupled to the backplane connector 202, and a third phase of the 3-phase input power is provided to a third phase line 224 coupled to the backplane connector 202.

The input line switching device 206 is coupled to a positive side of each one of the plurality of electrical outlets 104 and is configured to selectively couple the positive side of each outlet 104 to one of the first phase line 220, second phase line 222, and third phase line 224. The input line switching device 206 is also coupled to the controller 212 via an input select control line 213. The return line switching device 208 is coupled to a negative side of each one of the plurality of electrical outlets 104 and is configured to selectively couple the negative side of each outlet 104 to one of the first phase line 220, the second phase line 222, the third phase line 224, and a neutral line 226 coupled to the backplane connector 202. The return line switching device 208 is also coupled to the controller 212 via a return select control line 215. As shown in FIG. 1, the controller 212 is coupled to the input line switching device 206 and the return line switching device 208 via discrete control lines 213, 215; however, in other embodiments, the controller 212 may be coupled to the switching devices 206, 208 via a single control bus (e.g., an I²C bus).

As the 3-phase input power is provided from the power source 156 to the backplane connector 202 via the power connection 108 and each phase of the 3-phase input power is provided to one of the three phase lines 220, 222, 224, the input line switching device 206 and the return line switching device 208 are selectively configured, by the controller 212, to provide a desired phase-to-phase voltage (e.g., first phase line 220 to second phase line 222, second phase line 222 to third phase line 224, or third phase line 224 to first phase line 220) or phase-to-neutral voltage to each outlet 104.

The controller 212 monitors the loading of its own outlets 104 (e.g., via the current meters 210) and receives loading information from the other power modules 200 in the data center 150 (e.g., other power modules in the same PDU 100 or in other PDUs 100 in the data center 150) via the network 154, the communication outlet 106, and the data connector 204. Based on the loading information of power modules 200 (i.e., outlets 104) across the data center 150, the controller 212 operates the switching devices 206, 208 to couple the outlets 104 to at least one desired phase, of the 3-phase power, to better balance the loads coupled to each phase across the data center. Operation of the power module is discussed in greater detail below.

Figure 3:
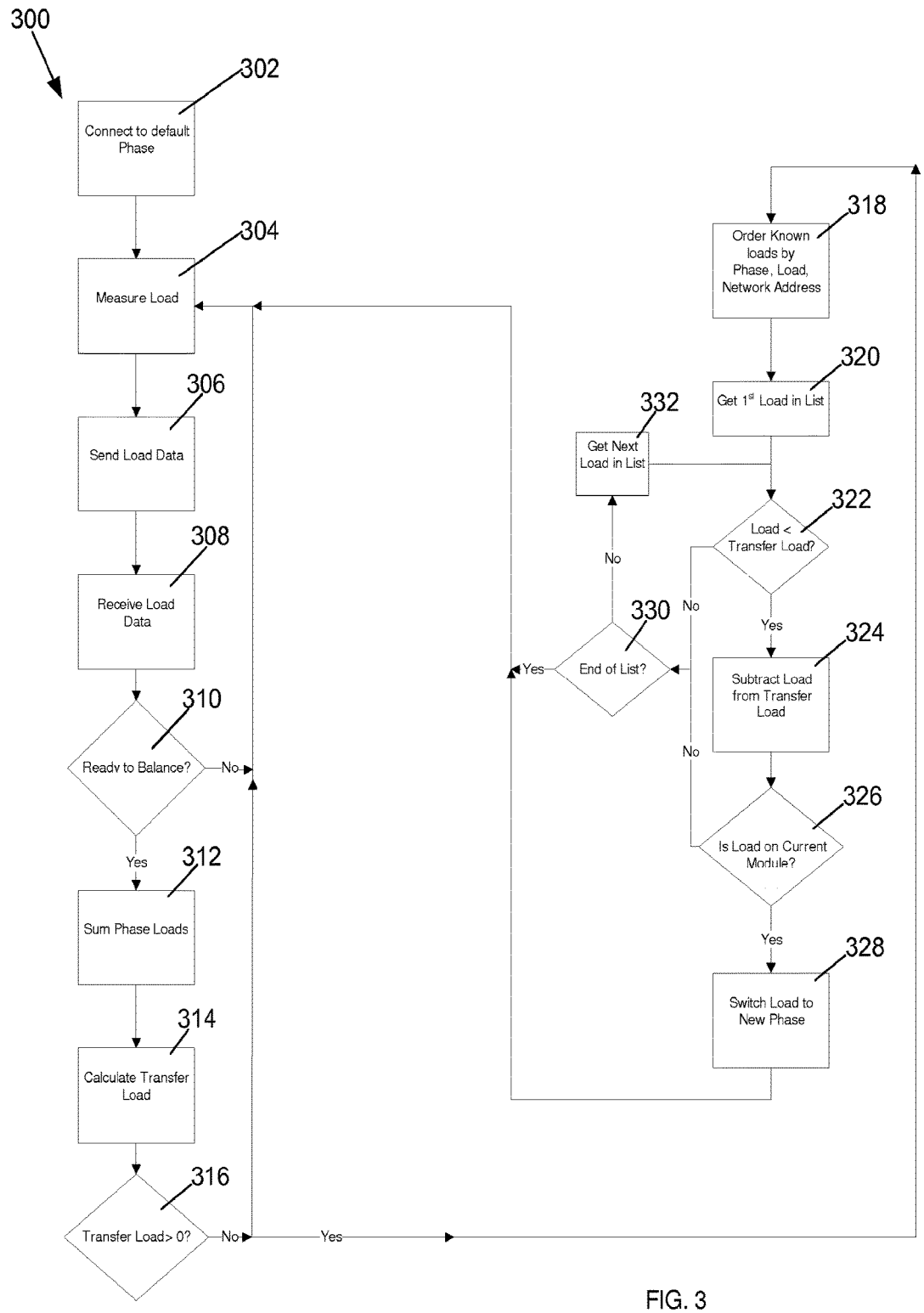
FIG. 3 is a flow chart illustrating a process for operating a power module according to aspects of the current invention.

FIG. 3 is a flow chart illustrating a process for operating a power module 200 according to one aspect of the current invention. At block 302, the controller 212 is powered on and operates the switching devices 206, 208 (via the control lines 213, 215) to couple the outlets 104 to the phase and neutral lines 220, 222, 224, 226 in a predetermined configuration. In one embodiment, the predetermined configuration is the configuration that the switching devices 206, 208 were in when the controller 212 was last powered down. In another embodiment, the predetermined configuration is another default configuration. AC power having the desired phase-to-phase or phase-to-neutral voltage (corresponding to the selected switching device 206, 208 predetermined configuration) is provided from the power connection 108 to each outlet 104.

At block 304, the controller 212 measures the current (via the current monitors 210) to each one of its outlets 104. At block 306, the controller 212 transmits its own loading information (based on the current measurements) to other power modules 200 in the data center 150 via the data connector 204, the communication outlet 106, and the network 154. In one embodiment, the controller 212 transmits its measured loading information at predetermined intervals. At block 308, the controller 212 receives loading information (via the network 154, the communication outlet 106, and the data connector 204) from other power modules 200 in the data center 150 (e.g., either in the same PDU 100 or in other PDUs 100) which are also providing power from the 3-phase power source 156 to loads through outlets.

In one embodiment, where the controller 212 communications with the other power modules 200 via a CAN bus, the loading information received from other power modules 200 by the controller 212 and the loading information transmitted to other power modules 200 by the controller 212 includes messages having a specific packet header which identifies the transmitting module 200 (e.g., the network address of the transmitting module) and a payload that indicates the total load on all outlets of the transmitting module 200 and identifies the phase (or phases) to which the outlets 104 of the transmitting module 200 are coupled.

According to one embodiment, the network 154 is bridged one or more times to form a supernet and the network address associated with each power module 200 is formed by iteratively concatenating all bridge addresses to the power module's network address. In one such an embodiment, with an IP bridge and a CAN network, each power module 200 is associated with a 40 bit address. The first four octets are the IP address of the bridge and the last octet is the CAN address of the power module 200. Thus, multiple CAN segments can be bridged together for the purpose of load balancing.

The controller 212 transfers the loading information from each received message and its own loading information to a table stored in memory associated with the controller 212 where the total load on each module 200 in the data center is tracked. In one embodiment, the table includes a network address for each module 200, the total load amount for each module 200, and the current phase(s) to which each module 200 is connected. In one embodiment, the table also includes a timestamp of the last message received for each module.

At block 310, the controller 212 determines if the module 200 is ready to balance loads. In one embodiment, the controller 212 determines that the module 200 is ready to balance loads if the module 200 has been operational for a predetermined period of time. In another embodiment, the controller 212 determines that the module 200 is ready to balance loads if a predetermined amount of time has elapsed since the last time balancing was performed.

According to another embodiment, the controller 212 determines that the module 200 is ready to balance loads if a redundant power source is active so that any connected loads will not drop while phases are switched. For example, where a load is coupled to both a power module 200 and a redundant power source and is capable of operating on power provide by either the power module 200 or the redundant power source, the controller 212 may only indicate that the module 200 is ready to balance loads if the redundant power source coupled to the load is active. By confirming that the redundant power source is active, the controller 212 ensures that the redundant power source is available to power the load, if needed, during phase switching (e.g., due to an error or an extended switching period where the module 200 is not providing power to the load).

Any number and/or configuration of conditions may be checked by the controller 212 to determine if the module 200 is ready to undergo load balancing. In response to a determination that the module 200 is not ready to balance loads, at block 304, the controller continues to monitor its own load (i.e., the current to each one of its outlets 104).

At block 312, in response to a determination that the module 200 is ready to balance loads, the controller 212 analyzes its generated table and calculates the total load on each phase of the 3-phase power (from the power source 156) across the data center by summing all loads in the table by phase. In one embodiment, the controller 212 ignores any entry in the table that has a timestamp indicating it has not been updated in a predefined period of time (i.e., is "too old" or has "timed out"). In one embodiment, the period of time beyond which an entry "times out" is defined to be several multiples of the predetermined intervals at which the controller 212 transmits loading information (e.g., at block 306); however, in other embodiments, the period of time may be defined as any appropriate amount of time.

At block 314, the controller 212 calculates an amount of load in the data center 150 that should be transferred from one phase of the 3-phase power to another (i.e., the transfer load amount). In one embodiment, the transfer load amount is defined as one half of the difference between the load amount on the highest loaded phase and the load amount on the least loaded phase. In other embodiments, the transfer load amount may be calculated differently.

At block 316, the controller 212 determines whether the calculated transfer load amount is greater than a minimum transfer load amount. In one embodiment, the minimum transfer load amount is zero; however, in other embodiments, the minimum transfer load amount may be defined differently. In response to a determination that the calculated transfer load amount is not greater than the minimum transfer load amount, at block 304, the controller 212 continues to monitor its own load (i.e., the current to each one of its outlets 104).

At block 318, in response to a determination that the calculated transfer load amount is greater than the minimum transfer load amount, the controller 212 generates, based on the information in its table, an ordered list of the total load amounts of each module 200 in the data center 150 (i.e., transferable loads in the data center 150). The ordered list also includes an identification (e.g., network address) of the power module 200 associated with each total load amount.

In one embodiment, the controller 212 generates the ordered list of transferable loads based on the phase associated with each total load amount, the magnitude of each total load amount, and the network address of the power module 200 associated with each total load amount. For example, the controller 212 may first order the total load amounts based on the associated phase of each total load amount. The total load amounts are grouped based on their associated phase and the total load amounts associated with the highest loaded phase of the 3-phase power (identified in block 312) are listed first.

The controller 212 may then order the total load amounts of each module 200 based on the magnitude of each total load amount. Within each group of total load amounts (i.e., grouped by phase), the total load amounts are ordered from the highest magnitude to the lowest magnitude. After the total load amounts are ordered based on phase and magnitude, the highest magnitude total load amount associated with the highest loaded phase (and corresponding power module 200 identification) is listed first in the ordered list. If more than one total load amount associated with the highest loaded phase has the same magnitude, the total load amount corresponding to the power module 200 with the lowest network address is listed first. According to other embodiments, the controller 212 may generate the ordered list of total load amounts from each modules 200 in the data center 105 based on some other order, configuration, and/or parameters of the power modules 200.

Where the power modules 200 across the data center 150 (i.e., in each PDU 100) are substantially the same and configured to generate the ordered list in the same way, at substantially the same time; the ordered list individually generated by each power module 200 based on loading information across the data center 150 will be the same. Each power module 200 receives loading information from the other power modules 200 but generates the ordered list of total load amounts independently, absent synchronization with the other power modules 200.

At block 320, the controller 212 retrieves the first total load amount from its ordered list of transferable loads. At block 322, the controller determines if the first total load amount is less than the previously calculated transfer load amount. In response to a determination that the first total load amount is not less than the transfer load amount, at block 330, the controller 212 determines if it has reached the end of the ordered transferable load list. In response to a determination that the controller 212 has reached the end of the ordered transferable load list, at block 304, the controller 212 continues to monitor its own load (i.e., the current to each one of its outlets 104). In response to a determination that the controller 212 has not reached the end of the ordered transferable load list, at block 332, the controller 212 retrieves the second total load amount from the ordered list and, at block 322, determines if the second total load amount is less than the transfer load amount. Blocks 322, 330, and 332 may be repeated as long as there remains unchecked total load amounts remaining in the ordered list or until a total load amount less than the transfer load amount is identified.

At block 324, in response to a determination that the first total load amount is less than the transfer load amount, the controller 212 subtracts the first total load amount from the transfer load amount. At block 326, the controller 212 determines if the first total load amount is associated with its own power module 200 (i.e., the outlets 104 associated with the controller 212). In one embodiment, the controller 212 determines if the first total load amount is associated with its own power module 200 by checking the identification (e.g., the network address) of the power module 200 associated with the first total load amount.

At block 328, in response to a determination that the first total load amount is associated with its own power module 200, the controller 212 sends control signals, via the control lines 213, 215, to operate the switching devices 206, 208 to couple the corresponding outlets 104 to the least loaded phase of the 3-phase power (identified at block 312). Upon transferring the first total load amount to the least loaded phase, at block 304, the controller 212 again monitors its own load (i.e., the current to each one of its outlets 104).

In response to a determination that the first total load is not associated with its own power module 200, the controller 212 progresses through the ordered transferable load list as discussed above (e.g., at blocks 330, 332, and 322) to determine if it should perform any phase shifting. Even if the controller 212 determines that the first total load amount is not associated with its own power module 200, the controller 212 assumes that the correct power module 200 associated with the first total load amount has been identified and adjusted appropriately because each controller 212 is operating on the same independently generated total load amount list (as discussed above). Direct synchronization between the power modules 200 with regard to the phase shifting is not required.

By balancing the loads coupled to each phase across the data center 150, the reactive power (VAR) of the data center 150 may be reduced and increased heat generation in the wire paths (e.g., due to increased total supply current) may be prevented.

Figure 4:
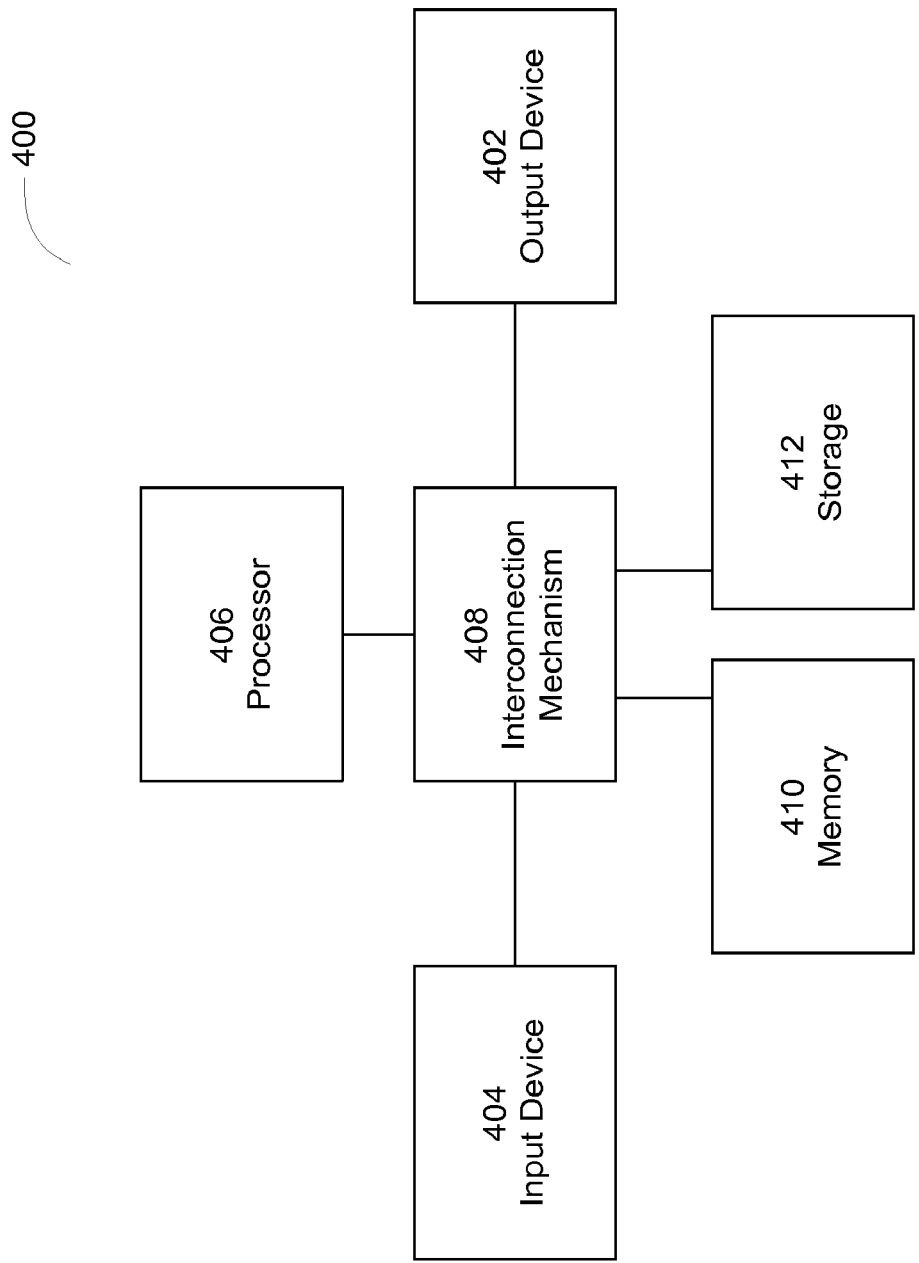
FIG. 4 is a block diagram of a system upon which various embodiments of the invention may be implemented.

FIG. 4 illustrates an example block diagram of computing components forming a system 400 which may be configured to implement one or more aspects disclosed herein. For example, the system 400 may be communicatively coupled to a controller or included within a controller, and/or configured to balance loads coupled to each phase of a data center as discussed above.

The system 400 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 400 may include specially-programmed, special-purpose hardware, for example, an application-specific integrated circuit (ASIC). Various aspects of the present disclosure may be implemented as specialized software executing on the system 400 such as that shown in FIG. 4.

The system 400 may include a processor/ASIC 406 connected to one or more memory devices 410, such as a disk drive, memory, flash memory or other device for storing data. For example, in one embodiment, the system 400 includes a Cortex-M4 Processor manufactured by ARM Holdings of Cambridge, UK; however, in other embodiments, other appropriate processors may be utilized.

Memory 410 may be used for storing programs and data during operation of the system 400. Components of the computer system 400 may be coupled by an interconnection mechanism 408, which may include one or more buses (e.g., between components that are integrated within a same machine) and/or a network (e.g., between components that reside on separate machines). The interconnection mechanism 408 enables communications (e.g., data, instructions) to be exchanged between components of the system 400.

The system 400 also includes one or more input devices 404, which may include for example, a keyboard or a touch screen. The system 400 includes one or more output devices 402, which may include for example a display. In addition, the computer system 400 may contain one or more interfaces (not shown) that may connect the computer system 400 to a communication network, in addition or as an alternative to the interconnection mechanism 408.

The system 400 may include a storage system 412, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 410 that allows for faster access to the information by the processor/ASIC than does the medium. This memory 410 may be a volatile, random access memory such as a dynamic random access memory (DRAM) or static memory (SRAM). It may be located in storage system 412 or in memory system 410. The processor 406 may manipulate the data within the integrated circuit memory 410 and then copy the data to the storage 412 after processing is completed. A variety of mechanisms are known for managing data movement between storage 412 and the integrated circuit memory element 410, and the disclosure is not limited thereto. The disclosure is not limited to a particular memory system 410 or a storage system 412.

The system 400 may include a general-purpose computer platform that is programmable using a high-level computer programming language. The system 400 may be also implemented using specially programmed, special purpose hardware, e.g. an ASIC. The system 400 may include a processor 406, which may be a commercially available processor such as the well-known Pentium class processor available from the Intel Corporation. Many other processors are available. The processor 406 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, the power modules 200 are utilized in PDUs of a data center rack; however, in other embodiments, the power modules 200 may be implemented in other types of PDUs, in other types of power distribution points or systems coupled to a 3-phase power source, or at other locations in the data center. For example, a power module 200 may be implemented at upstream distribution points in the data center. In another example, a power module 200 may be implemented in equipment that operates at the utility power grid level.

As described above, the power module 200 includes two switching devices 206, 208. The dual switching devices give the data center enhanced flexibility to balance loads; however, in other embodiments, the power module 200 may include a single switching device. As also described above, the configuration of the switching devices 206, 208 is determined by the controller 212; however, in other embodiments, the switching devices 206, 208 may be manual switches operated by a user. In such an embodiment, the controller 212 transmits signals to the user (e.g., via a user interface) instructing the user on how to manually configure the switches to best balance the load. In other embodiments, at least one switch may be configured to operate manually or automatically.

As also described above, each outlet 104 in a power module 200 is collectively coupled, via the switch circuits 206, 208, to the same phase(s) of the 3-phase power; however, in other embodiments, different groups of outlets (or even individual outlets) may be coupled separately to different phase(s) of the 3-phase power. For example, a power module 200 may include a first switch circuit that is configured to couple a first group of outlets 104 to a first phase of the 3-phase power and a second switch circuit that is configured to couple a second group of outlets 104 to a second phase of the 3-phase power. The first phase to which the first group is coupled may be the same or different than the second phase to which the second group is coupled. A power module may include any number of switches and/or any number of different outlet groups.

As described above, in balancing loads, a power module 200 shifts its load from the highest loaded phase to the least loaded phase; however, in other embodiments, the power module 200 may be configured to shift loads differently.

According to one embodiment, the controller 212 calculates the total energy savings of the system (due to the balancing of loads). The cost savings may be a result of reduced reactive power and/or a reduced need to provide cooling due to increased input current. In one embodiment, the calculated total energy savings is displayed to a user via a user interface.

According to one embodiment, to integrate a power module 200 with a non-balancing power network, the power module 200 may be coupled to the non-balancing power network via an adaptor that informs the power module 200 of the loading of the non-balancing power network. Once it has received loading information from the non-balancing power network, the power module 200 may perform balancing (as discussed above) while taking into account the loading of the non-balancing power network.

As discussed above, metering is performed (by current meters 210) at each outlet 104 to monitor the loading of each outlet of a module 200. In other embodiments, metering of each phase line 220-224 could be performed at the backplane connector 202, at the power connection 108, or at some other point in each module 200 to monitor the total loading of each phase of each module 200.

As described above, PDUs 100 (and corresponding power modules 200) communicate via a network 154; however, in other embodiments, PDUs 100 (and corresponding power modules 200) may be coupled directly to one another via data connections 106 and may be able to communicate directly with one another.

According to one embodiment, the power modules 200 are configured to balance loads coupled to each phase of a 3-phase power source across a data center 150; however, in other embodiments, the power modules 200 may be configured to balance loads coupled to each phase of a 3-phase power source across a smaller grouping of power modules 200. For example, the power modules 200 may be configured to balance loads across a single PDU 100, within a relatively small grouping of PDUs, across a relatively small grouping of equipment racks (e.g., across 1-8 equipment racks), or across a single 3-phase power supply feed. The power modules 200 may be configured to balance loads across any number of power modules 200.

At least some embodiments described herein provide a system and method that automatically balances loads across available phases in a data center environment. In at least one embodiment, a power module independently controls its own outlets based on the loading of phases across the data center. The power module intelligently selects the phase-to-phase or phase-to-neutral input for the devices coupled to the module based on the power usage of devices across the entire data center. The ability of the power module to select between the lower phase-to-neutral voltage and the higher phase-to-phase voltage gives the data center operator enhanced flexibility.

By balancing the loads coupled to each phase across multiple power modules of a data center, the reactive power (VAR) of the data center may be reduced and increased heat generation in the wire paths (e.g., due to increased total supply current) may be prevented. In addition, with each power module independently identifying appropriate phase shifting in the data center, direct synchronization between the power modules with regard to the phase shifting is not required.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A Power Distribution Unit (PDU), the PDU comprising:
   an input configured to be coupled to a power source to receive 3-phase power from the power source;
   a plurality of phase lines coupled to the input, each phase line configured to carry one phase of the 3-phase power;
   a neutral line coupled to the input;
   a plurality of outlets;
   a plurality of current monitors, each of the plurality of current monitors coupled to a corresponding one of the plurality of outlets, and each of the plurality of current monitors further configured to generate a signal indicative of current from one of the plurality of phase lines to the corresponding one of the plurality of outlets;
   a first switch circuit configured to selectively couple the plurality of outlets to the plurality of phase lines;
   a second switch circuit configured to selectively couple each of the plurality of outlets to one of the neutral line and a second one of the plurality of phase lines;
   a data connection; and
   a controller coupled to the plurality of current monitors, the first switch circuit, the second switch circuit, and the data connection, wherein the controller is configured to receive the signals from the plurality of current monitors to monitor current from the plurality of phase lines to the plurality of outlets, receive, via the data connection, phase loading information related to 3-phase power of at least one external device coupled to the power source, and operate the first switch circuit and the second switch circuit to provide one of a phase-to-phase voltage and a phase-to-neutral voltage to each of the plurality of outlets based on the current and the received phase loading information.

2. The PDU of claim 1, wherein the controller is further configured to transmit, to the at least one external device via the data connection, phase loading information based on the current.

3. The PDU of claim 1, wherein the controller is further configured to receive phase loading information from an external device that is substantially the same as the PDU.

4. A method for operating a PDU, the PDU comprising a power input configured to receive 3-phase power from a power source, a neutral line coupled to the input, a plurality of phase lines coupled to the input, each phase line configured to carry one phase of the 3-phase power, and a plurality of outlets, each outlet configured to provide at least one phase of the 3-phase power to a load coupled to the outlet, the method comprising:
   monitoring current from the power input to each one of the plurality of outlets;
   receiving, from at least one external device coupled to the power source, phase loading information related to the 3-phase power; and selectively coupling, with a first switch circuit in the PDU, each one of the plurality of outlets to one of the plurality of phase lines, and with a second switch circuit in the PDU, each one of the plurality of outlets to one of the neutral line and a second one of the plurality of phase lines, to provide one of a phase-to-phase voltage and a phase-to-neutral voltage to each of the plurality of outlets based on the current and the received phase loading information.

5. The method of claim 4, wherein receiving phase loading information comprises:
receiving, from the at least one external device, a total load amount of the at least one external device and an identification of at least one phase, of the 3-phase power, which is providing at least a portion of the total load amount to the at least one external device.

6. The method of claim 5, wherein selectively coupling each one of the plurality of outlets comprises calculating a total load amount per phase of the 3-phase power based on the current and the received total load amounts and phase identifications.

7. The method of claim 6, wherein selectively coupling each one of the plurality of outlets further comprises:
identifying a highest loaded phase and a least loaded phase of the 3-phase power based on the calculated total load amounts per phase of the 3-phase power; and
calculating a load transfer amount based on the calculated total load amount of the highest loaded phase.

8. The method of claim 7, wherein selectively coupling each one of the plurality of outlets further comprises generating an ordered list of transferable loads based on the monitored current and the received total load amounts and phase identifications.

9. The method of claim 8, wherein generating the ordered list of transferable loads include generating the ordered list of transferable loads based on a network address of the at least one external device.

10. The method of claim 9, wherein selectively coupling each one of the plurality of outlets further comprises:
selecting a first one of the transferable loads from the ordered list;
determining whether the first one of the transferable loads is less than the load transfer amount; and
in response to a determination that the first one of the transferable loads is less than the load transfer amount, subtracting the first one of the transferable loads from the load transfer amount to generate an updated load transfer amount and determining whether the first one of the transferable loads is associated with the plurality of outlets.

11. The method of claim 10, wherein selectively coupling each one of the plurality of outlets further comprises:
in response to a determination that the first one of the transferable loads is associated with the plurality of outlets, coupling each one of the plurality of outlets to the least loaded phase of the 3-phase power; and
in response to a determination that the first one of the transferable loads is not associated with the plurality of outlets, selecting a second one of the transferable loads from the ordered list and determining whether the second one of the transferable loads is less than the updated load transfer amount.

12. The method of claim 11, wherein selectively coupling each one of the plurality of outlets further comprises:
in response to a determination that the second one of the transferable loads is less than the updated load transfer amount, subtracting the second one of the transferable loads from the updated load transfer amount, and determining whether the second one of the transferable loads is associated with the plurality of outlets.

13. The method of claim 12, wherein selectively coupling each one of the plurality of outlets further comprises:
in response to a determination that the second one of the transferable loads is associated with the plurality of outlets, coupling each one of the plurality of outlets to the least loaded phase of the 3-phase power.

14. The method of claim 4, further comprising determining that redundant power is available, and wherein selectively coupling includes selectively coupling each one of the plurality of outlets to one phase of the 3-phase power in response to the determination that redundant power is available.

15. A data center, the data center comprising:
a power source providing 3-phase power;
a plurality of PDUs, each PDU including an input configured to receive 3-phase power from the power source, a plurality of outlets, a neutral line coupled to the input, and a plurality of phase lines coupled to the input, each phase line configured to carry one phase of the 3-phase power, and each PDU configured to selectively couple, with a first switch circuit, each one of the plurality of outlets to one of the plurality of phase lines, and with a second switch circuit, each one of the plurality of outlets to one of the neutral line and a second one of the plurality of phase lines, to provide one of a phase-to-phase voltage and a phase-to-neutral voltage to each one of the plurality of outlets;
a network coupled to the plurality of PDUs, and
means for sharing phase loading information related to the 3-phase power between the plurality of PDUs and balancing, across the data center environment, loading of the 3-phase power based on the phase loading information.

* * * * *